Feb. 27, 1968  A. W. ALBERTINE ET AL  3,370,813
ADJUSTABLE PASSENGER READING LIGHTS AND UTILITIES
Filed Oct. 22, 1965  2 Sheets-Sheet 1
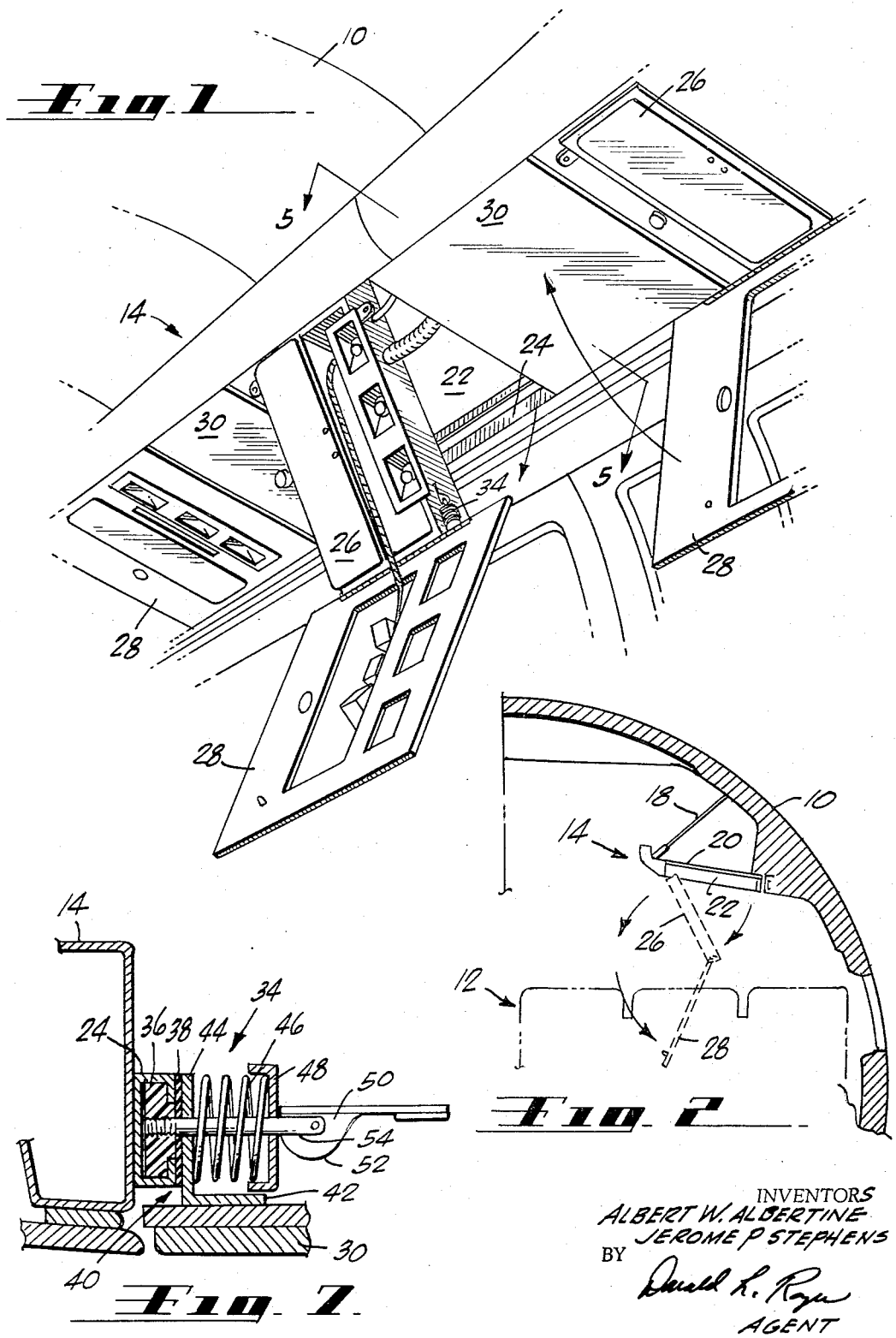
INVENTORS
ALBERT W. ALBERTINE
JEROME P STEPHENS
BY
AGENT Feb. 27, 1968   A. W. ALBERTINE ET AL   3,370,813
ADJUSTABLE PASSENGER READING LIGHTS AND UTILITIES
Filed Oct. 22, 1965   2 Sheets-Sheet 2
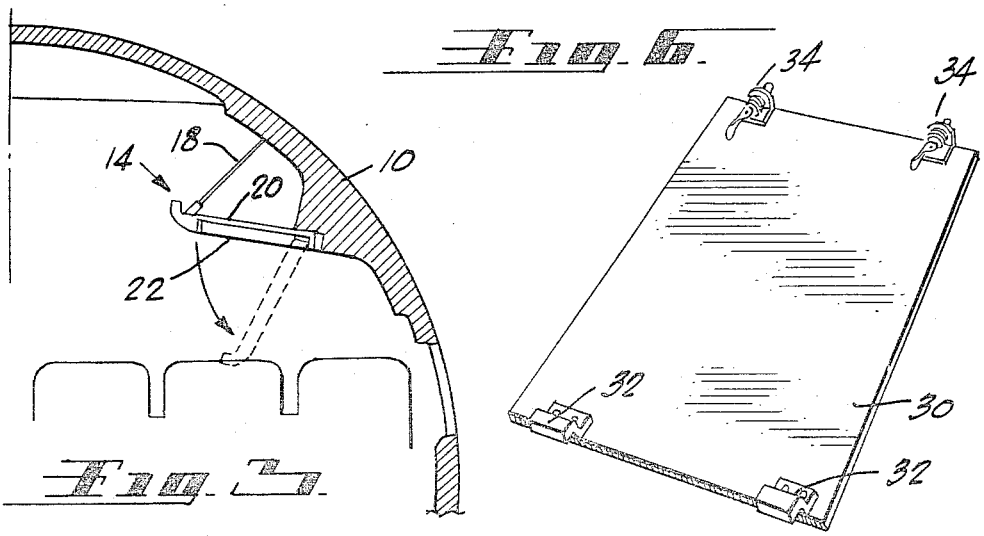
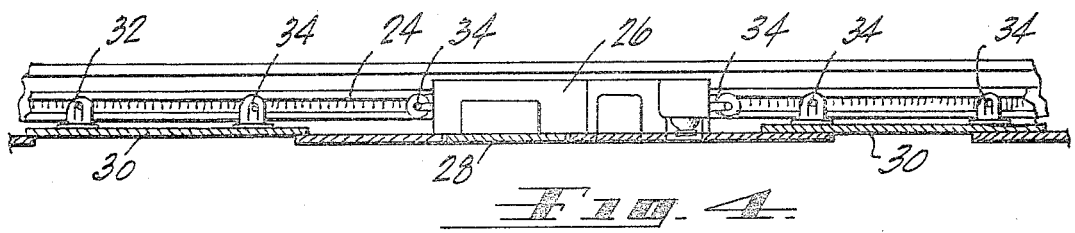
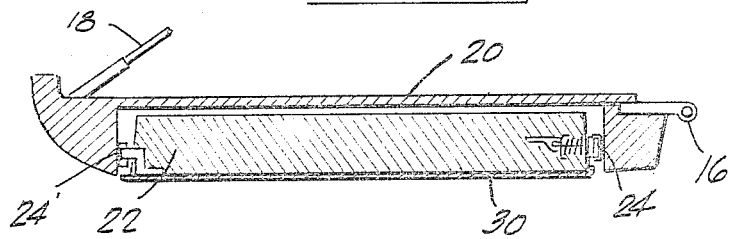
INVENTORS
ALBERT W. ALBERTINE
JEROME P. STEPHENS
BY
AGENT

United States Patent Office 3,370,813
Patented Feb. 27, 1968

3,370,813
ADJUSTABLE PASSENGER READING LIGHTS
AND UTILITIES
Albert W. Albertine, Santa Monica, and Jerome P.
Stephens, Orange, Calif., assignors, by mesne assignments, to McDonnell Douglas Corporation,
Santa Monica, Calif., a corporation of Maryland
Filed Oct. 22, 1965, Ser. No. 500,893
4 Claims. (Cl. 244—118)

ABSTRACT OF THE DISCLOSURE

An overhead passenger utility apparatus for use in commercial vehicles having utility boxes which are adjustable to correspond to the passenger seat spacing.

This invention relates to an adjustable passenger utility apparatus and more particularly to an installation in an airplane stowage rack of ceiling panels containing passenger reading lights and utilities.

It is commonplace in many forms of commercial transportation, such as bus, train and airplane, to install a passenger stowage rack directly above each row of passenger seats. Normally such racks are of simple construction and used only for the purpose of storing small personal passenger articles. However, in aircraft such racks have also been employed to contain individual passenger reading lights, air outlets and individual oxygen outlets, such being accessible to the passengers through the underside of the rack. Although the rack of this invention is primarily designed to be employed in aircraft, it is conceivable that such a rack or similar modification could be employed in other forms of transportation or wherever the use of such a rack would be desired.

The seat spacing in each row of seats is usually different in different aircraft and different in aircraft where there are different classes of service. The utility portion (lights, air and oxygen) of the stowage rack is conveniently located directly above each seat, therefore, the distance between adjacent utility portions vary as to the seat spacing. It has been common practice to install the utility portions in panels and have spacing panels of various lengths to be located between the utility panels. Such an arrangement requires an assortment of panel lengths and upon a change in seat spacing, a corresponding change in spacing panels is required. It is obvious that such panel changing requires much time and effort besides the maintaining of a stock of different length panels.

One solution to the above problem is to mount the utilities on the underside of the stowage rack and allow for separate adjustment of each utility portion. However, although such an installation prevents panel changing, it creates a hazardous condition to the passengers to have the utilities protrude beneath the stowage rack.

The stowage rack incorporating this invention eliminates the changing of spacing panels without the protrusion of the utility portions from the stowage rack. The outlets for the utilities are mounted in utility panels, the resultant unit being adjustably mounted on a channel-track by means of low friction sliders. Spacing panels are installed frontward and rearward of each utility panel, also being adjustably mounted by means of the same track arrangement. The spacing panels are installed so as to overlap the utility panels. Therefore, the utility panels are adjustable with respect to each other a distance equal to the length of the spacing panel i.e., the spacing panel could be completely hidden or completely exposed.

The installation of the ceiling panels of this invention incorporates several novel features other than the novel adjustment arrangement. A stowage rack formed of several easily installable sections comprises one aspect of the invention. Novel installation of the utility box in the stowage rack is to provide for ease in maintenance and repair. Novel latch means to fasten the sliding panels to the channel-shaped track is to facilitate ease in adjustability and locking of the panels.

Other objects and features of the invention will become apparent as the description proceeds, particularly when taken in conjunction with the accompanying drawing illustrating the invention wherein:

FIG. 1 is a pictorial view of the stowage rack of this invention showing particularly the utility portion;

FIG. 2 is a side view of the stowage rack as installed in an aircraft fuselage;

FIG. 3 is a side view of the stowage rack showing the procedure for removal of a section of the rack;

FIG. 4 is a view taken longitudinally of the rack showing the adjustability of the utility portions and spacing panels;

FIG. 5 is a side view taken along line 5—5 of FIG. 1;

FIG. 6 is a view of the underside of a spacing panel; and

FIG. 7 is a view showing the particular latch for nonmovably holding the utility panels and spacing panels in place.

Referring to the drawings, particularly to FIGURES 1, 2, 3 and 5, an aircraft fuselage 10 is shown containing passenger seats 12. The stowage rack of this invention is shown generally as 14 being mounted on the fuselage 10 and extending above the seats 12. The rack 14 is hingedly mounted on the fuselage 10 by means of brackets 16. The opposite end of the rack 14 is supported by means of tie rods 18. The rack 14 is composed of several sections each approximately six feet in length. A bracket 16 and a tie rod 18 is mounted on each end of each section. Brackets 16 and rods 18 facilitate easy installation and removal of rack sections.

The rack 14 has a flat top portion 20 adapted to stow personal passenger articles and a hollow interior portion 22. The interior portion 22 contains channel-shaped guide means 24 and 24' mounted longitudinally on the opposite spaced sides of the interior portion. Utility box 26 which contains the electrical socket and light bulbs for the passenger reading lights and the outlets for the air vents and oxygen supply is slidably mounted longitudinally in the guide means 24 and 24'. A utility panel 28 is hingedly mounted to one edge of the utility box 26 so that the panel 28 rotates downwardly and outwardly toward the aircraft fuselage with respect to the utility box. The utility box 26 is hinged to the rack 14 so that the box 26 will rotate downwardly and inwardly toward the interior of the aircraft. This means of hinging facilitates ease of entry and maintenance to the passenger utilities.

On each side of the utility panel 28 a spacing panel 30 is slidably mounted on the guide means 24 and 24'. The utility panel 28 is of such a size as to cover the utility box 26 and also extend several inches in length on both sides of the utility box. The spacing panels 30 are mounted so that each spacing panel overlaps the extended portions of the utility panels 28 in such a manner as to have the spacing panels 30 located interiorly or overlap the utility panels (FIG. 4). As can be seen from FIG. 1 the panels are arranged in the sequence of spacing panel, utility panel, spacing panel, etc.

Each utility box 26 and spacing panel 30 is slidable on the guide means 24, 24'. Mounted on each box 26 and panel 30 are sliders 32 and locking sliders 34 (FIGURE 6). The sliders 32 are positioned to slide in guide means 24' and the locking sliders 34 are positioned to slide in guide means 24, such positioning being for convenience of locking and unlocking, but should in no way limit the invention. A slider 32 is rigidly secured to its respective panel or box in the vicinity of the fore and aft edge of its length. Each slider is formed of a low friction, easily slidable material, an example of such a material being polytetrafluoroethylene resin, commonly sold under the trademark Teflon.

Locking sliders 34 function in the same manner and are similarly constructed as sliders 32, but, additionally include a friction type of locking means to prevent, when desired, panel or box movement. The locking slider 34 is shown more clearly in FIGURE 7. Locking slider 34 comprises a guide plate 36 formed of a low-friction, easily slidable material such as polytetrafluoroethylene resin, and matingly fitted into guide means 24. A friction pad 38 is placed adjacent plate 36 and being adapted to contact a portion of the guide means 24. Mounting L-shaped bracket 40 is rigidly connected to the panel 30 (or box 26) by means of one leg 42 of the bracket 40 with the other leg 44 being placed adjacent the pad 38. A coil spring 46 is operable between the leg 44 and spring retainer 48. A handle 50 has a cam portion 52 which is adapted to operate adjacent the spring retainer 48. Rod 54 is rigidly connected to the guide plate 36 and pivotally connected to handle 50 with the pad 38, leg 44, spring 46 and retainer 48 sandwiched therebetween.

The operation of the locking slider is as follows: With the handle 50 in the position as shown in FIG. 7, the guide plate 36 is free to move within guide means 24 thereby allowing adjustment of the panel 30 with respect to the stowage rack 14. When it is desired to lock the panel in place, the handle 50 is pivoted about rod 54 causing cam 52 to move the retainer 48. The movement of the retainer 48 compresses the coil spring 46. One end of the spring 46 abuts the leg 44 of the fixed bracket 40. Since the leg 44 is non-movable, the force of the spring reacts by pushing retainer 48, handle 50 and consequently rod 54 in a direction to force together plate 36, guide means 24, pad 38 and leg 44. Thereby, a frictional holding force is established between guide means 24, pad 38 and the fixed bracket leg 44 preventing movement of panel 30.

The operation and installation of the entire stowage rack is as follows: Each section of the stowage rack 14 is installed in the aircraft fuselage as shown in FIG. 3. The rack is placed as shown by the dotted lines in FIG. 3 and pivotally mounted to the fuselage by means of the brackets 16. The rack is then rotated clockwise to the solid line position and tie rods 18 connected. The reverse of the above steps will accomplish easy and quick removal of a rack section.

The operation of the utility box and adjoining panel is clearly shown in FIGS. 1 and 2. Utility panel 28 is normally mounted flush by any conventional receiving means with the underside of the stowage rack 14. When it is desired to adjust or maintain the utility box 26, panel 28 is pivoted counterclockwise allowing entry to the box 26. The box 26 may then be adjusted by the unlocking of locking sliders 34. It may be desired to allow box 26 to rotate downward and inward with respect to the fuselage as shown in FIG. 2. To allow such box rotation several conventional means may be incorporated in the locking sliders 34. For example, a slot in bracket leg 44 to permit entry and withdrawal of rod 54 may be employed. However such particular means to allow rotation of the box forms no part of this invention and need not be shown or described in detail.

From FIG. 4, it can be seen that the spacing between utility boxes 26 can be varied considerably. Each spacing panel 30 could be completely covered by adjacent utility panels 28 or completely exposed and any intermediate spacing desired. It has been found that a variance of 25 inches to 40 inches is adequate for the distance between adjacent utility boxes.

Since each utility box 26 contains outlets for air and oxygen plus passenger reading lights, conduits are required for passage of air and oxygen to the outlets and transmission of electricity to the reading lights. Flexible conduits are employed but such conduits are not practically capable of allowing for the large distance variance. As a result, a series of connections are provided in the fuselage of the aircraft directly adjacent the stowage rack. It has been found that a spacing of these connections of approximately 14 inches or less is adequate.

While the invention has been described in one embodiment, it is to be understood that the words which have been used are words of description rather than of limitation and that changes within the scope of the appended claims may be made without departing from the true scope and spirit of the invention in its broader aspects.

We claim:
1. In a device for use in passenger vehicles comprising:
   a stowage rack adapted for use by the vehicle passengers;
   a utility means to contain outlets for passenger utilities, said passenger utilities being devices to aid passengers in comfort and convenience, said utility means being longitudinally adjustable within said stowage rack after initial installation;
   a utility panel covering the exterior of said utility means and extending longitudinally on each side of said utility means;
   a spacing panel adjustably located within said stowage rack, said spacing panel contacting said utility panel in an overlapping relationship, said spacing panel and said utility panel being adjustable with respect to each other.

2. In a device for use in passenger vehicles as defined in claim 1 including:
   said utility means being adjustably mounted within said rack by means of a guide track arrangement, said utility means having sliders adapted to slidingly contact said guide track arrangement;
   said spacing panels having sliders being adapted to slidably contact said guide track arrangement.

3. In a device for use in passenger vehicles as defined in claim 2 including:
   one of said sliders on both the utility means and spacing panel having means to firmly hold said utility means and spacing panel against movement with respect to said guide means.

4. An apparatus to facilitate ease of adjustability of vehicle passenger reading lights and utilities comprising:
   a passenger vehicle having sets of parallel passenger seats, said sets of seats being located in rows in said vehicle, one or more individual seats in each set of seats;
   a stowage rack being adapted to be located directly above said vehicle passenger seats, said stowage rack extending substantially the length of said passenger seats, said stowage rack having an upper portion and a lower portion;
   a plurality of utility boxes, said boxes being adapted to contain devices to aid the passengers in comfort and convenience, one of the devices being passenger reading lights;
   said utility boxes being installed in the interior of said stowage rack, said devices contained in said utility boxes being accessible to operation and use by said passengers through said lower portion of said stowage rack, there being one utility box for each of said sets of passenger seats;
   channel-shaped guide means mounted longitudinally within said stowage rack, said guide means being composed of two separate sections mounted in a parallel facing relationship, each section being mounted on a vertical wall within the interior of said stowage rack;
   sliders mounted on said utility boxes, said sliders matingly connecting with said guide means and allowing longitudinal movement of said utility boxes, at least one of said sliders being so constructed as to be capable of locking said utility boxes in a fixed position;
   utility panels covering the exteriors of each of said utility boxes, each of said utility panels having portions extending beyond the length of said utility boxes on each side of said boxes;

a spacing panel located between each two adjacent utility panels, each spacing panel having sliders and being longitudinally adjustable on said guide means, at least one of said sliders being capable of locking said spacing panel in a fixed position;

said spacing panels overlap the extended portions of said utility panels, whereby said utility panels can be adjusted with respect to said spacing panels so as to completely expose or completely cover said spacing panels or any intermediate position thereof.

References Cited

UNITED STATES PATENTS

| | | | |
|---|---|---|---|
| 3,330,506 | 7/1967 | Robillard et al. | 244—118 |
| 2,251,050 | 7/1941 | Hagerty et al. | 105—325 |
| 2,284,356 | 5/1942 | Arenberg | 105—325 |
| 2,396,039 | 3/1946 | Burton et al. | 244—118 |
| 2,541,864 | 2/1951 | Eksergian | 105—325 |
| 2,541,898 | 2/1951 | Watter | 105—325 |

MILTON BUCHLER, *Primary Examiner.*

T. W. BUCKMAN, *Assistant Examiner.*